United States Patent
Sevaston

(12) 
(10) Patent No.: US 6,567,040 B1
(45) Date of Patent: May 20, 2003

(54) OFFSET POINTING IN DE-YAWED PHASED-ARRAY SPACECRAFT ANTENNA

(75) Inventor: George E. Sevaston, Hermosa Beach, CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/510,838

(22) Filed: Feb. 23, 2000

(51) Int. Cl.[7] ............................................. H04B 7/185
(52) U.S. Cl. .................................. 342/354; 342/372
(58) Field of Search ............................ 342/352, 354, 342/372, 373; 455/12.1, 13.1

(56) References Cited

U.S. PATENT DOCUMENTS

| | | | |
|---|---|---|---|
| 4,843,397 A | * 6/1989 | Galati et al. | .................. 342/59 |
| 5,175,556 A | 12/1992 | Berkowitz | |
| 5,227,802 A | * 7/1993 | Pullman et al. | ............. 342/352 |
| 5,530,449 A | 6/1996 | Wachs et al. | |
| 5,587,714 A | 12/1996 | Chu | |
| 5,739,784 A | * 4/1998 | Jan et al. | .................... 342/354 |
| 6,011,512 A | * 1/2000 | Cohen | ........................ 342/372 |
| 6,020,845 A | * 2/2000 | Weinberg et al. | ........... 342/354 |

OTHER PUBLICATIONS

Louis Stark, Microwave Theory Of Phased–Array Antennas—A Review Dec. 12, 1974, pp. 1661 through 1701.

* cited by examiner

Primary Examiner—Thomas H. Tarcza
Assistant Examiner—Dao L. Phan
(74) Attorney, Agent, or Firm—Gates & Cooper LLP

(57) ABSTRACT

A method and system are provided for electronically steering a phased array antenna mounted on a spacecraft to reduce or eliminate pointing error by modifying the phased array steering commands in a way that compensates for the offset, even on yaw steered spacecraft whose antenna beams must be de-yawed to minimize the movement of spot beams pointed to the surface of the Earth. Electronic offset pointing on de-yawed phased array antennas is achieved by computing a set of pointing control parameters on the ground, and uplinking the parameters for final processing on-board the spacecraft. The control parameters are derived so that only minimal changes to the on-board processing capabilities are required relative to a de-yawing control arrangement alone.

9 Claims, 2 Drawing Sheets

OFFSET POINTING IN DE-YAWED PHASED-ARRAY SPACECRAFT ANTENNA

TECHNICAL FIELD

The present invention generally relates to communication control arrangements for spacecraft such as geosynchronous satellites, and more particularly, to an improved offset pointing arrangement for de-yawed phased array antennas.

BACKGROUND ART

Generally, satellites are positioned in geosynchronous orbit about the Earth to provide a relay for signal transmissions between different Earth locations. Angular offsets between the antenna of a space based communication system and the coordinate system of the satellite/host spacecraft will cause the antenna beam pattern to be improperly pointed.

In the past, various mechanical arrangements have been utilized to keep the satellite antenna coverage pattern aligned with a specific region of the Earth. Such systems typically provide physical biasing of the satellite attitude so as to compensate for any misalignment between antenna coverage and the desired satellite coordinate frame. Such physical biasing requires movement of the entire satellite.

However, movement of the entire satellite/spacecraft by any of a plurality of inertial techniques undesirably depletes the stored energy of the satellite. This in turn leads to an increase in the amount of fuel required to fire the appropriate attitude thrusters on the space craft. Thus, the use of physical movement control in order to provide antenna offset pointing decreases mission life and increases ground support logistics for on-orbit operation management.

Other arrangements have been proposed which employ a phased array antenna arrangement which can be electronically "steered" to provide offset pointing compensation. While such an arrangement eliminates the need for physically biasing the spacecraft, the size and capabilities of on-board processing electronics are significantly increased and made more complex, thereby increasing the cost and payload of the spacecraft.

Electronic angular offset compensation using a phased array antenna is further complicated for yaw steered spacecraft which require concomitant de-yawing of the antenna beams to minimize movement of the spot beams relative to the desired coverage area. More specifically, one such antenna de-yawing control is implemented using on-board processing of uplinked control parameters calculated by ground control to provide electronic offset correction of a phased array antenna arrangement. The combined needs for processing de-yawing commands and offset pointing commands further complicates and enlarges the on-board processing electronics.

Therefore, a need exists for a satellite/spacecraft antenna offset pointing control arrangement which compensates for the spacecraft motion and/or orbital drift by maintaining the antenna pattern precisely pointed at a desired Earth coverage area which does not require physical biasing of the satellite, or significantly increase on-board processing requirements, particularly for de-yawed spacecraft.

DISCLOSURE OF THE INVENTION

It is therefore an object of the present invention to provide a method and system for control of offset pointing of a phased-array antenna which reduces on-board processing complexity and obviates the need for physical biasing of a spacecraft.

It is another object of the present invention to provide a method and system for control of offset pointing of a phased-array antenna mounted on a spacecraft which allows reduces the number of necessary on-board computations using a set of control parameters uplinked from a ground controller.

It is yet another object of the present invention to provide a method and system for control of offset pointing of a phased-array antenna which reduces on-board processing complexity for de-yawed spacecraft.

In accordance with these and other objects, the present invention provides a method and system for controlling offset pointing of a phased array antenna arrangement mounted on a spacecraft which controls electronic pointing compensate for any deviations in desired antenna coverage relative the Earth, thereby eliminating the need for physical movement of the spacecraft. The offset pointing control is accomplished via a set of steering control parameters which allow offset compensation even if the spacecraft is physically reoriented, i.e., de-yawed, with respect to the Earth. The control parameters are preferably uplinked for minimal final processing by an on-board processor and beam controller.

More specifically, a beam controller, which is responsive to set of control parameters transmitted by a remote ground command station, is controlled via an on-board processor to electronically steer the phased array antenna to correct for detected orbital drift. Such drift can be measured by use of spacecraft-based sensor arrangements and relayed to a ground control station. The uplinked control parameters reduces on-board processor complexity while reducing spacecraft fuel consumption typically expended in correcting for such drift.

Thus, in accordance with the present invention, a phased array antenna is used to reduce or eliminate pointing error by modifying the phased array steering commands in a way that compensates for the offsets. The present invention, moreover, does so even on yaw steered spacecraft whose antenna beams must be de-yawed to minimize the movement of spot beams pointed to the surface of the Earth. In particular, the present invention achieves electronic offset pointing on de-yawed phased array antennas with only minimal changes required to the on-board processing requirements when compared to a de-yawing control arrangement alone.

The present invention makes it possible to compensate for misalignments between a spacecraft and a communication payload antenna without physically biasing the spacecraft attitude. Since most space based communication systems employ Earth sensors for attitude measurement, and since the accuracy of Earth sensors degrades when they are operated off null, the present invention eliminates a significant source of pointing error. In addition, the present invention simplifies the on-board processing required to achieve electronic offset correction on de-yawed phased array antennas by implementing some of the required computations off-line on the ground. By application of the invention, only two additions per antenna beam per beam steering computational cycle are required for simultaneous electronic offset compensation and beam de-yawing when compared to de-yawing alone.

These and other features, aspects, and embodiments of the present invention will become better understood with regard to the following description, appended claims, and accompanying drawings.

BEST MODE FOR CARRYING OUT THE INVENTION

Figure 1:
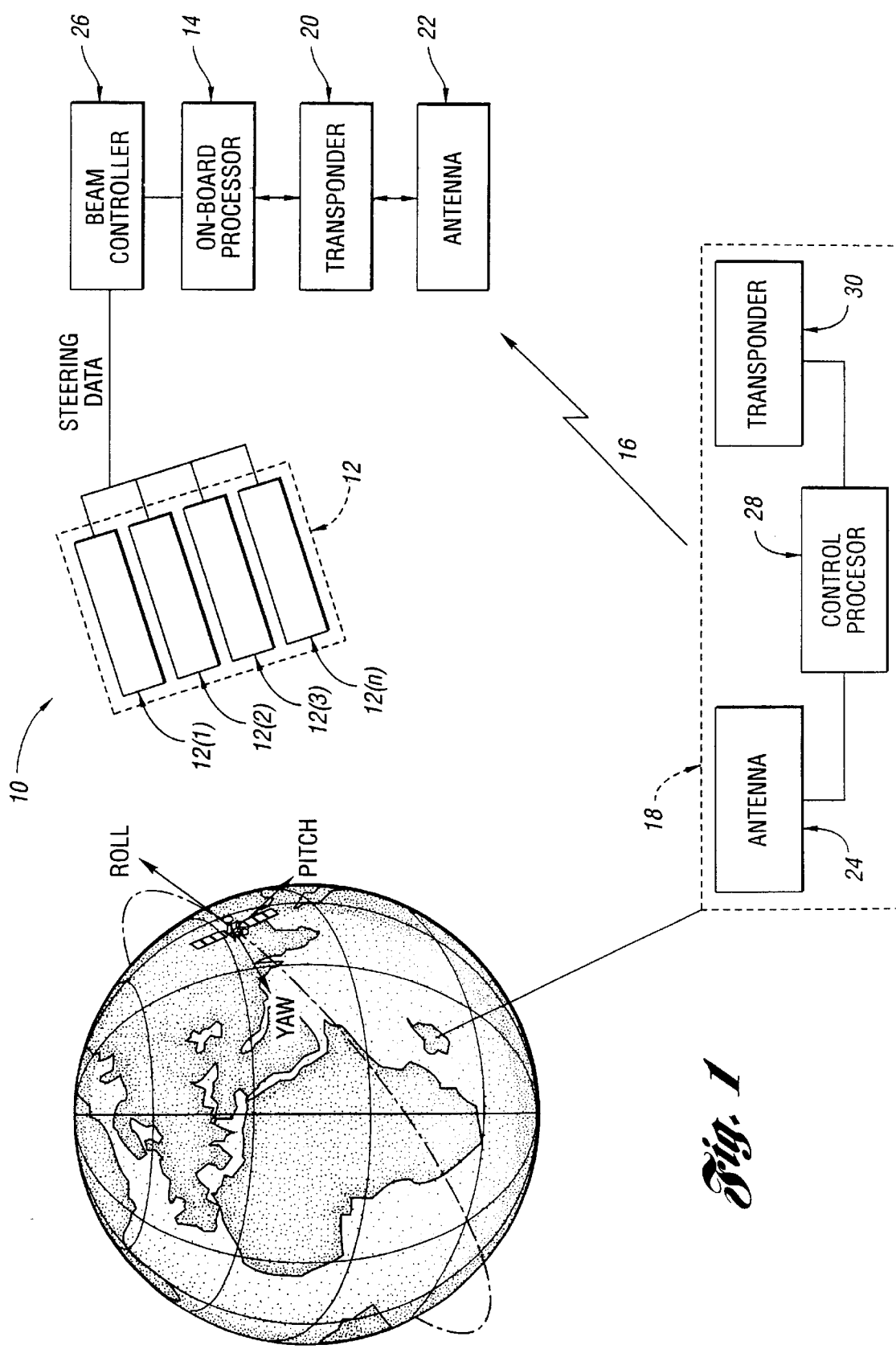
FIG. 1 is a block diagram of a satellite phased-array antenna steering system in accordance with the present invention.

Referring to FIG. 1, a spacecraft 10 such as a satellite has mounted thereon at least one phased-array communication antenna 12 having a radiation pattern which may be reconfigured or "steered" to a desired angle so as to be directed at a desired coverage area on the Earth's surface. The phased-array antenna includes a plurality of antenna elements 12(1) to 12(n), each receiving individual phase-setting data from a control processor 14 located on-board the spacecraft. A common RF signal line 16 is utilized for communication between the spacecraft and one or more ground control station(s) 18. As described in more detail below, the pattern and direction of each antenna beam can be reconfigured to compensate for offset between antenna 12 and the coordinate system of spacecraft 10 via computed parameters uplinked from the ground station 18 for use in a modified de-yawing operation by control processor 14.

As further illustrated, the geosynchronous spacecraft includes a transponder 20 having a dedicated antenna 22 for receiving signals 16 from ground station 18. The beam radiation angle is established by individual phase delays for each of the n array channels, responsive to the individual control parameters uplinked from the ground controller. Control processor 14 cooperates with array phase shifters in a beam controller arrangement 26 to effect the desired antenna radiation pattern reconfiguration without requiring physical movement of the spacecraft. Thus, control processor 14 is arranged in accordance with known design criteria to output phase data implementing a final offset computation made on-board the spacecraft. At least one ground station 18 includes a processor 28 and transponder 30 arranged to generate the uplinked control parameters as described below. The ground control data is provided responsive to signals received at a ground command receiver antenna 24 in manner known in the art.

In a preferred embodiment, the present invention provides six parameters to be uplinked and stored for each antenna beam. Thus, only two additions per antenna beam per iteration are required over the number of operations required for de-yawing alone. While this represents a preferred embodiment, it is possible to trade necessary memory requirement for additional processing capability by determining the six parameters on-board as they are needed from the beam direction unit vector components, U and V, and the role and pitch offsets. Some of the intermediate parameters involved in the computation can be pre-computed, e.g., sines, cosines and sine-cosine products, thereby minimizing the number of computations which must be repeated. In addition, as described below, where small angles are involved, the on-board processing required in the as-needed implementation can be further reduced.

In accordance with the present invention, implementing offset pointing of the phased-array antenna is accomplished by dividing correctional computations for each beam into those required to be executed on-board the spacecraft because of the need to estimate a current yaw value, and those which can be computed on the ground because the required information is known a-priori.

On-board computations are as follows:

$$U' = (\cos \psi)k_1 + (\sin \psi)k_2 + k_3; \text{ and}$$

$$V' = -(\sin \psi)k_4 + (\cos \psi)k_5 + k_6$$

where U' and V' are the RF spot beam unit vector components (different for each beam) in the actual S-band antenna frame; $k_1$ through $k_6$ are uplinked parameters (one set per spot beam); and $\psi$ is the spacecraft yaw angle at the time the RF beam pointing correction is to be applied.

The ground station computations are as follows:

$$k_1 = (\cos \theta)U;$$

$$k_2 = (\cos \theta)V;$$

$$k_3 = -(\sin \theta)sqrt[1-(U^2+V^2)];$$

$$k_4 = (\cos \theta)U - (\sin \phi)(\sin \theta)V;$$

$$k_5 = (\sin \phi)(\sin \theta)U + (\cos \phi)V; \text{ and}$$

$$k_6 = (\sin \phi)(\cos \theta)sqrt[1-(U^2+V^2)];$$

where U and V are the RF spot beam unit vector components in the orbit normal coordinate frame; $\theta$ and $\phi$ are the pitch and roll offset angles respectively; and sqrt( ) is the square root operation.

Parameters $k_1$ through $k_6$ are then uplinked for each spot beam whenever U, V, $\theta$ 1or $\phi$ are changed.

Thus, in accordance with the present invention, the beam steering/offset control equations have a form similar to those used in a simple de-yawing transformation, wherein the difference amounts to the addition of a constant to each equation. In fact, the offset control equations of the present invention reduce to de-yawing equations when the pitch and roll offsets are set to zero.

Figure 2:
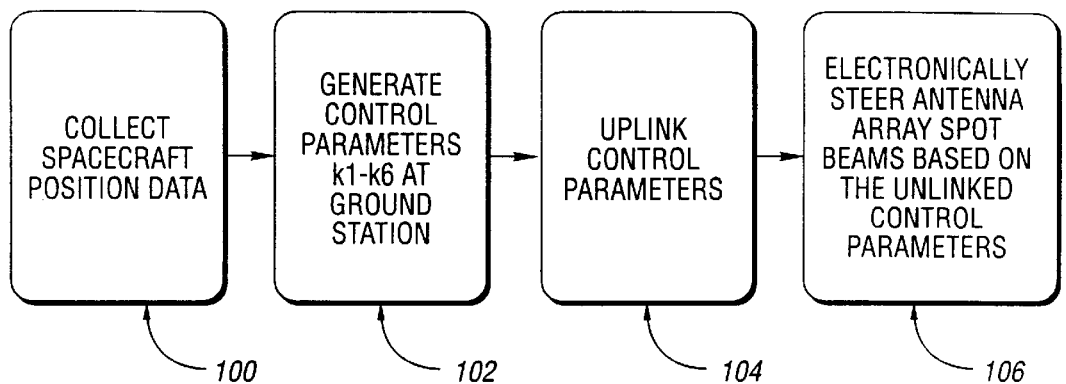
FIG. 2 is a flow chart illustrating operation of the present invention.

FIG. 2 provides a flow chart illustrating the overall process in accordance with the present invention. More specifically, at block 100, data regarding the position of the spacecraft is collected or compiled for use by the ground control station control processor. As denoted at block 102, the ground control processor generates the set of control parameters $k_1-k_6$ based on the collected position data.

After the control parameters are generated, the parameters are uplinked at block 104 to the control processor on-board the spacecraft. At block 106, control signals for electronically steering the spot beams for each antenna element are generated by the on-board processor based on the uplinked set of control parameters. As noted above, the set of control parameters are generated as a function of antenna element spot beam unit vector components in an orbit normal coordinate frame and measured pitch and roll offset angles, and the control signals are generated as spot beam unit vector components for each beam in an actual antenna frame based on the set of uplinked control parameters and a measured spacecraft yaw angle at the time the beam pointing correction is to be applied to the array of antenna elements.

An explanation of the derivation for the above offset control parameters of the present invention will now be provided. For a given a ground commanded RF payload pointing vector defined in orbit normal coordinates (i.e., velocity vector, cross velocity vector, nadir), the control parameters are determined so as to effect rotation of the RF payload offset command to accommodate for deviation of the spacecraft frame (i.e., roll, pitch, yaw) from the orbit normal frame.

Figure 3:
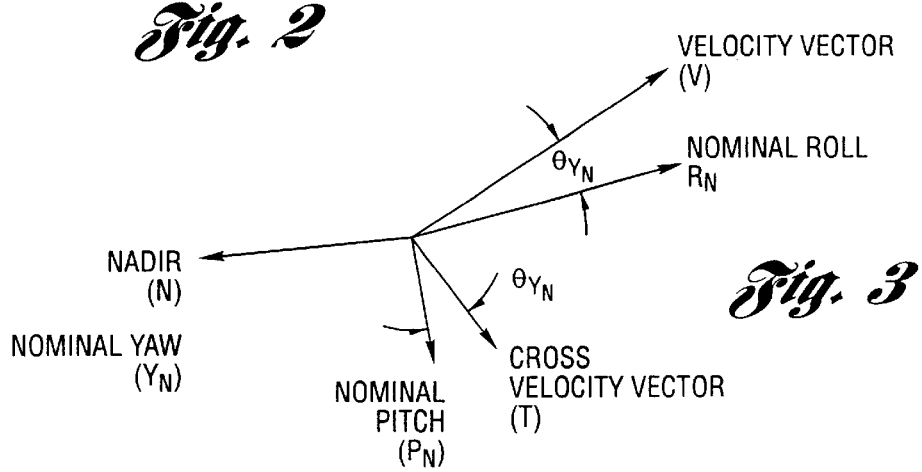
FIG. 3 is plot illustrating the vector representation of spacecraft deviation arising from yaw steering, deliberate roll and pitch offset pointing bias, and attitude control errors.

These deviations arise from yaw steering, deliberate roll and pitch offset pointing bias, and attitude control errors. For purposes of offset control in accordance with the resent invention, the latter source of deviation is ignored. These deviations are represented in FIG. 3.

For purposes of analysis, the orbit normal frame (V,T,N) is denoted by $\theta$, and the nominal frame ($R_n$, $P_n$, $Y_n$) is denoted by N. Therefore, the cross velocity vector T is derived as follows:

$$T\uparrow_0^N = \begin{bmatrix} \cos\theta_{Y_N} & \sin\theta_{Y_N} & 0 \\ -\sin\theta_{Y_N} & \cos\theta_{Y_N} & 0 \\ 0 & 0 & 1 \end{bmatrix}$$

Figure 4:
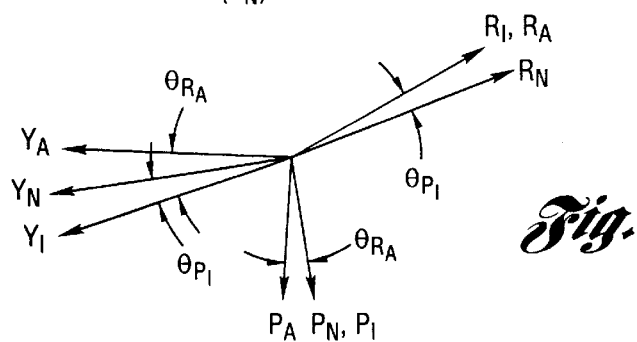
FIG. 4 is plot illustrating the vector representation of an intermediate and actual frame.

Referring to FIG. 4, an intermediate frame ($R_I$, $P_I$, $Y_I$) is then denoted by I, and an actual frame ($R_A$, $P_A$, $Y_A$) is denoted by A. The cross velocity vector can then be expressed as:

$$T\uparrow_N^I = \begin{bmatrix} \cos\theta_{P_I} & 0 & -\sin\theta_{P_I} \\ 0 & 1 & 0 \\ \sin\theta_{P_I} & 0 & \cos\theta_{P_I} \end{bmatrix}; \quad T\uparrow_I^A = \begin{bmatrix} 1 & 0 & 0 \\ 0 & \cos\theta_{R_A} & \sin\theta_{R_A} \\ 0 & -\sin\theta_{R_A} & \cos\theta_{R_A} \end{bmatrix}$$

The corrected pointing unit vector can be determined based on the pointing unit vector from the ground as follows:

$$\begin{bmatrix} X_A \\ Y_A \\ Z_A \end{bmatrix} = T\uparrow_I^A \; T\uparrow_N^I \; T\uparrow_0^N \begin{bmatrix} X_0 \\ Y_0 \\ Z_0 \end{bmatrix}.$$

In accordance with the present invention, the following definitions are made:

$\theta_{Y_N}$ is the commanded yaw steering angle;

$\theta_{P_I}$ is the commanded pitch offset angle; and $\theta_{R_A}$ is the commanded roll offset angle.

The scalar form of the RF payload pointing will now be described.

$$T\uparrow_I^A \; T\uparrow_N^I \; T\uparrow_0^N = \begin{bmatrix} 1 & 0 & 0 \\ 0 & \cos\theta_{R_A} & \sin\theta_{R_A} \\ 0 & -\sin\theta_{R_A} & \cos\theta_{R_A} \end{bmatrix} \begin{bmatrix} \cos\theta_{P_I} & 0 & -\sin\theta_{P_I} \\ 0 & 1 & 0 \\ \sin\theta_{P_I} & 0 & \cos\theta_{P_I} \end{bmatrix} \begin{bmatrix} \cos\theta_{Y_N} & \sin\theta_{Y_N} & 0 \\ -\sin\theta_{Y_N} & \cos\theta_{Y_N} & 0 \\ 0 & 0 & 1 \end{bmatrix} =$$

$$\begin{bmatrix} \cos\theta_{P_I}\cos\theta_{Y_N} & \cos\theta_{P_I}\sin\theta_{Y_N} & -\sin\theta_{P_I} \\ \sin\theta_{R_A}\sin\theta_{P_I}\cos\theta_{Y_N} - \cos\theta_{R_A}\sin\theta_{Y_N} & \sin\theta_{R_A}\sin\theta_{P_2}\sin\theta_{Y_N} + \cos\theta_{R_A}\cos\theta_{Y_N} & \sin\theta_{R_A}\cos\theta_{P_I} \\ \cos\theta_{R_A}\sin\theta_{P_I}\cos\theta_{Y_N} + \sin\theta_{R_A}\sin\theta_{Y_N} & \cos\theta_{R_A}\sin\theta_{P_I}\sin\theta_{Y_N} - \sin\theta_{R_A}\cos\theta_{Y_N} & \cos\theta_{R_A}\cos\theta_{P_I} \end{bmatrix}$$

Further:

$X_0 = U$ $Y_0 = V$ $Z_0 = \pm\sqrt{1-(U^2+V^2)}$

Since ($Y_0$, $Y_0$, $Z_0$) must point toward the Earth, only the positive root is used, i.e.:

$$\begin{bmatrix} X_0 \\ Y_0 \\ Z_0 \end{bmatrix} = \begin{bmatrix} U \\ V \\ +\sqrt{1-(U^2+V^2)} \end{bmatrix}$$

$X_A = U'$;

$Y_A = V'$; and $Z_A$ is not required.

Therefore:

$U' = (\cos\theta_{P_I}\cos\theta_{Y_N})U + (\cos\theta_{P_I}\sin\theta_{Y_N})V - \sin\theta_{P_I}\sqrt{1-(U^2+V^2)}$ $V' = (\sin\theta_{R_A}\sin\theta_{P_I}\cos\theta_{Y_N} - \cos\theta_{R_A}\sin\theta_{Y_N})U + (\sin\theta_{R_A}\sin\theta_{P_I}\sin\theta_{Y_N} + \cos\theta_{R_A}\cos\theta_{Y_N})V + (\sin\theta_{R_A}\cos\theta_{P_I})\sqrt{1-(U^2+V^2)}$ It is noted that since $\theta_{R_A}$ and $\theta_{P_I}$ are nominally fixed, cos $\theta_{P_I}$, sin $\theta_{P_I}$, cos $\theta_{R_A}$ and sin $\theta_{R_A}$ are also fixed.

Thus, the control parameters of the present invention are defined as follows:

cos $\theta_{P_I}U = k_1$;

cos $\theta_{P_I}V = k_2$;

$-\sin\theta_{P_I}\sqrt{1-(U^2+V^2)} = k_3$;

$\sin\theta_{R_A}\sin\theta_{P_I}U=k_4;$ $\cos\theta_{R_A}U=k_5;$ $-\sin\theta_{R_A}\sin\theta_{P_I}V=k_6;$ $\cos\theta_{R_A}V=k_7;$ and $\sin\theta_{R_A}\cos\theta_{P_I}\sqrt{1-(U^2+V^2)}=k_8.$ Each of these parameters are computed on the ground and uplinked as time profiles in place of U and V.

Therefore, $U'=\cos\theta_{Y_N}k_1+\sin\theta_{Y_N}k_2+k_3$ $V'=\cos\theta_{Y_N}k_4+\sin\theta_{Y_N}k_5+\sin\theta_{Y_N}k_6+\cos\theta_{Y_N}k_7+k_8,$ which are compiled on the spacecraft, such as at a rate of 1 Hz.

In addition, since:

$V'=-\sin\theta_{Y_N}(k_5+k_6)+\cos\theta_{Y_N}(k_4+k_7)+k_8,$ values for $k_5+k_6$ and $k_4+k_7$ can be uplinked instead of individual values for $k_4$, $k_5$, $k_6$ and $k_7$.

Figure 5:
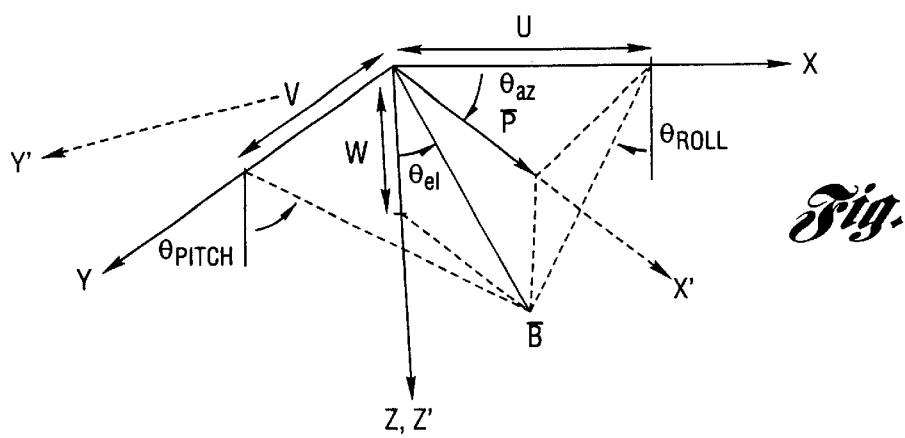
FIG. 5 is plot illustrating the vector representation for phased-array beam steering for combined de-yawing and offset pointing control in accordance with the present invention.

Referring now to FIG. 5, phased-array beam steering will now be described for combined-yawing and offset pointing control. The following definitions are made:

$\|\vec{B}\|=1;$ $\vec{B}=U\hat{a}X+V\hat{a}Y+W\hat{a}Z;$ $\vec{P}=U\hat{a}X+V\hat{a}Y;$ and $\begin{bmatrix} U \\ V \\ W \end{bmatrix} = \begin{bmatrix} \cos\theta_{a_z}\sin\theta_{e_1} \\ \sin\theta_{a_z}\sin\theta_{e_1} \\ \cos\theta_{e_1} \end{bmatrix} = [\vec{B}]_{X,Y,Z \; frame}$ It is known from "Microwave Theory of Phased-Array Antennas—A Review," Lo Stork$_1$ Proceedings of the IEEE, December 1974, $\Delta\phi(X', Y') = \phi(X', Y') - \phi(o, o) = -\left[\frac{2\pi}{\lambda}\sin\theta_{e_1}\right]X' \forall Y;$ and $\Delta\phi(X, Y) = -\frac{2\pi}{\lambda}\sin\theta_{e_1}\cos\theta_{a_z}X -$ $\frac{2\pi}{\lambda}\sin\theta_{e_1}\sin\theta_{a_z}Y - \frac{2\pi}{\lambda}(UX+VY) - \frac{2\pi}{\lambda}\begin{bmatrix} U \\ V \end{bmatrix}^T \begin{bmatrix} X \\ Y \end{bmatrix}$ If $\vec{B}$ is specified in orbit normal coordinates, while the phased array antenna is fixed only in payload coordinates, $\vec{B}$ must first be converted to payload coordinates before the antenna element phase offsets are compiled.

Assuming a roll, pitch, and yaw ordering, $\begin{bmatrix} U^1 \\ V \\ W^1 \end{bmatrix} = \begin{bmatrix} 1 & 0 & 0 \\ 0 & \cos\delta\theta_r & \sin\delta\theta_r \\ 0 & -\sin\delta\theta_r & \cos\delta\theta_r \end{bmatrix} \begin{bmatrix} \cos\delta\theta_p & 0 & -\sin\delta\theta_p \\ 0 & 1 & 0 \\ \sin\delta\theta_p & 0 & \cos\delta\theta_p \end{bmatrix}$ $\begin{bmatrix} \cos\psi & \sin\psi & 0 \\ -\sin\psi & \cos\psi & 0 \\ 0 & 0 & 1 \end{bmatrix} \begin{bmatrix} U \\ V \\ W \end{bmatrix}$ $U=(\cos\psi)(\cos\delta\theta_p U)+(\sin\psi)(\cos\delta\theta_p V)+(-\sin\delta\theta_p W);$ and $V=(\sin\psi)(\cos\delta\theta_r U)+(\cos\psi)(\cos\delta\theta_r V)+(\sin\delta\theta_r\cos\delta\theta_p W).$ Assuming small angles, $k_1 \cong U$; 1 part in $10^5$ error for $\delta\theta_p=0-3°$;

$k_2 \cong V$; 1 part in $10^5$ error for $\delta\theta_r=0-3°$;

$k_3 \cong \delta\theta_p W$; 2 parts in $10^8$ error for $\delta\theta_p=0-3°$;

$k_4 \cong U \cong k_1$;

$k_5 \cong V \cong k_2$;

$k_6 \cong \delta\theta_r W$.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations which fall within the spirit and broad scope of the appended claims.

What is claimed is:

1. A system for controlling offset pointing of a plurality of antenna array elements mounted to a spacecraft comprising:

a beam controller connected to the array of antenna elements for controlling a radiation pattern for each element;

an on-board processor coupled to the beam controller and a control signal receiver;

at least one ground control station comprising a processor programmed to collect data regarding position of the spacecraft relative to a desired reference frame and to generate a set of control parameters based on the collected position data, and a transmitter for uplinking the set of generated control parameters to the control signal receiver on-board the spacecraft, wherein the control processor is programmed to generate control signals for controlling the beam controller to electronically steer the radiation pattern for each of the plurality of antenna array elements based on the uplinked set of control parameters, the set of control parameters being generated by the ground station processor as a function of antenna element spot beam unit vector components in an orbit normal coordinate frame and measured pitch and roll offset angles.

2. The system of claim 1 wherein the on-board processor is programmed to generate the beam controller control signals as spot beam unit vector components for each beam in an actual antenna frame based on the set of uplinked control parameters and a measured spacecraft yaw angle at the time the beam pointing correction is to be applied to the array of antenna elements.

3. The system of claim 2 wherein the set of uplinked control parameters are generated as follows:

$$k_1 = (\cos\theta)U;$$

$$k_2 = (\cos\theta)V;$$

$$k_3 = -(\sin\theta)sqrt[1-(U^2+V^2)];$$

$$k_4 = (\cos\theta)U - (\sin\phi)(\sin\theta)V;$$

$$k_5 = (\sin\phi)(\sin\theta)U + (\cos\phi)V; \text{ and}$$

$$k_6 = (\sin\phi)(\cos\theta)sqrt[1-(U^2+V^2)];$$

where U and V are the spot beam unit vector components in the orbit normal coordinate frame; and $\theta$ and $\phi$ are the pitch and roll offset angles respectively.

4. The system of claim 3 wherein the beam controller control signals are generated as follows:

$$U' = (\cos\psi)k_1 + (\sin\psi)k_2 + k_3; \text{ and}$$

$$V' = -(\sin\psi)k_4 + (\cos\psi)k_5 + k_6$$

where U' and V' are the spot beam unit vector components in the actual antenna frame; $k_1$ through $k_6$ are the set of uplinked control parameters; and $\psi$ is the measured spacecraft yaw angle.

5. A method for controlling offset pointing of a plurality of antenna array elements mounted to a spacecraft comprising:
   - collecting data regarding position of the spacecraft relative to a desired reference frame;
   - at a ground station, generating a set of control parameters based on the collected position data;
   - uplinking the set of generated control parameters to a control processor on-board the spacecraft; and
   - generating control signals on-board the spacecraft for electronically steering the radiation patters for each of the plurality of antenna array elements based on the uplinked set of control parameters wherein the set of control parameters are generated as a function of antenna element spot beam unit vector components in an orbit normal coordinate frame and measured pitch and roll offset angles.

6. The method of claim 5 wherein the control signals are generated as spot beam unit vector components for each beam in an actual antenna frame based on the set of uplinked control parameters and a measured spacecraft yaw angle at the time the beam pointing correction is to be applied to the array of antenna elements.

7. The method of claim 6 wherein the set of uplinked control parameters are generated as follows:

$$k_1 = (\cos\theta)U;$$

$$k_2 = (\cos\theta)V;$$

$$k_3 = -(\sin\theta)sqrt[1-(U^2+V^2)];$$

$$k_4 = (\cos\theta)U - (\sin\phi)(\sin\theta)V;$$

$$k_5 = (\sin\phi)(\sin\theta)U + (\cos\phi)V; \text{ and}$$

$$k_6 = (\sin\phi)(\cos\theta)sqrt[1-(U^2+V^2)];$$

where U and V are the spot beam unit vector components in the orbit normal coordinate frame; and $\theta$ and $\phi$ are the pitch and roll offset angles respectively.

8. The method of claim 7 wherein the beam controller control signals are generated as follows:

$$U' = (\cos\psi)k_1 + (\sin\psi)k_2 + k_3; \text{ and}$$

$$V' = -(\sin\psi)k_4 + (\cos\psi)k_5 + k_6$$

where U' and V' are the spot beam unit vector components in the actual antenna frame; $k_1$ through $k_6$ are the set of uplinked control parameters; and $\psi$ is the measured spacecraft yaw angle.

9. The method of claim 5 further comprising uplinking the set of control parameters for each spot beam whenever the antenna element spot beam unit vector components in the orbit normal coordinate frame and the measured pitch and roll offset angles are changed.

* * * * *